United States Patent Office 3,780,029
Patented Dec. 18, 1973

3,780,029
AZINE COMPOUNDS
Taras Jaskewycz, 76A Fach St., Box Hill,
Victoria 3128, Australia
No Drawing. Filed Oct. 27, 1970, Ser. No. 84,511
Int. Cl. C07d 55/22
U.S. Cl. 260—240 B  10 Claims

ABSTRACT OF THE DISCLOSURE

Substituted benzaldazine compounds derived from

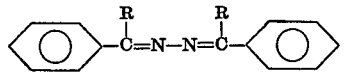

find use as optical brightening agents in the detergent, textile and paints industries. Preferred substituents of the benzyl group are dichloro triazinyl amino and other substituted triazinyl amino groups. Also of use is diamino benzaldazine. One preferred composition is obtained as the reaction product of a mixture of diamino benzaldazine, diamino stilbene and cyanuryl chloride.

Although diamino benzaldazine itself is known many of the substituted compounds are novel.

---

This invention relates to new benzaldazine derivatives and their use as optical brightening agents, particularly in detergent compositions and in the treatment of paper, plastics and textiles.

Optical brightening agents operate by absorbing electromagnetic radiation in the ultra-violet region of the spectrum and re-emitting it in the violet and blue parts of the visible spectrum. Many materials, especially textiles and paper, have a natural yellowish tinge as a result of their absorbing rather than reflecting light in the blue-violet range and the release of light in this region by optical brightening agents tends to compensate for the loss of whiteness. By the application of optical brighteners it is possible not only to replace the light lost through absorption, thereby attaining a neutral complete white but through use of extra brightener to convert still more ultra-violet radiation into visible light. Hitherto the most common compounds used as optical brighteners have been the derivatives of diamino stilbene sulphonic acid.

Accordingly the present invention provides compounds of the general formula:

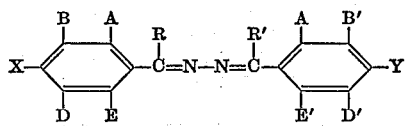

wherein R and R' may be the same or different and represent hydrogen or a group which is not strongly electron donating or withdrawing, having a Hammett σ-value in the range $-0.25$ and $+0.25$. A, B, D, E, A', B', D' and E' may be the same or different and represent hydrogen, halogen or any one of the following groups: hydroxyl; nitrile; amino; —SO$_3$M where M represents hydrogen or an alkali or alkaline earth metal: SO$_2$W where W represents a substituted amide; alkyl or aryloxy group; and X and Y may be the same or different and represent primary amino, an amide group or a secondary amino group, that is one having one N—H bond.

The present invention also provides optical brightening agents containing compounds of Formula I.

Compounds of Formula I may be prepared by the condensation reaction between hydrazine and an aldehyde of general formula:

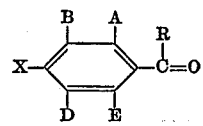

where A, B, D, E, R and X represent the same groups as previously defined.

The substituents on the benzene ring modify the light absorption or emission characteristics of the compounds or render them suitable for a particular application.

The secondary amine groups occurring in the X and Y positions are those groups of general formula:

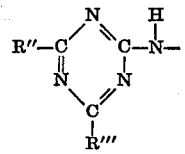

wherein R" and R'" may be the same or different and are selected from the following groups:
 (a) Halogen or hydroxyl.
 (b) Phenylamine

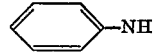

or a sulphonated phenylamino

(as its alkali metal salt) or alkylated phenylamino phenylamine

or halogen substituted phenylamino, e.g., p-chloro aniline.
 (c) Morpholine.
 (d) —NA$_1$A$_2$ where A$_1$ and A$_2$ are hydrogen,
  —C$_3$H$_4$OH, Cl, C$_2$H$_5$ or other short alkyl chain groups and are the same or different.
 (e) CH$_3$CH(OH)CH$_2$—O—, or any short chain alkoxy radical.
 (f)

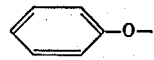

or alkyl substituted derivative thereof.
 (g)

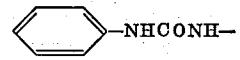

or alkyl substituted derivative thereof.
 (h)

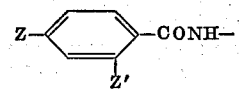

where Z is a methyl or methoxy group and Z' is a methyl or hydrogen.
 (i) Phenyl.

Such compounds may be prepared by the reaction of a diaminobenzaldazine with cyanuric chloride in the presence of alkali, followed by reaction with appropriate compounds to introduce the substituents, R'' and R'''.

Amide groups suitable for substitution at the X and Y positions are those of the formula:

R*CONH— where R* is an alkyl group of 1 to 12 carbon atoms or is an aryl or substituted aryl group. If it is a substituted aryl group the substituents will normally be in the ortho and/or para positions and are typically alkyl, alkoxy, hydroxy, ethoxy, halogenoalkyl or alkenyloxy groups.

One compound which has been found to be particularly useful as an optical brightening agent is NH' di(3,5-dichlorotriazinyl) para aminobenzaldazine of the formula:

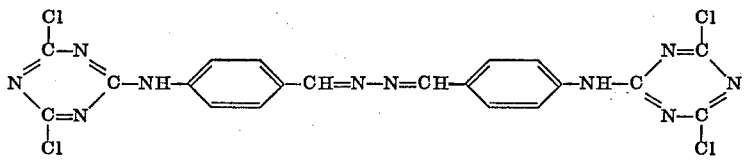

Other especially useful compounds include:

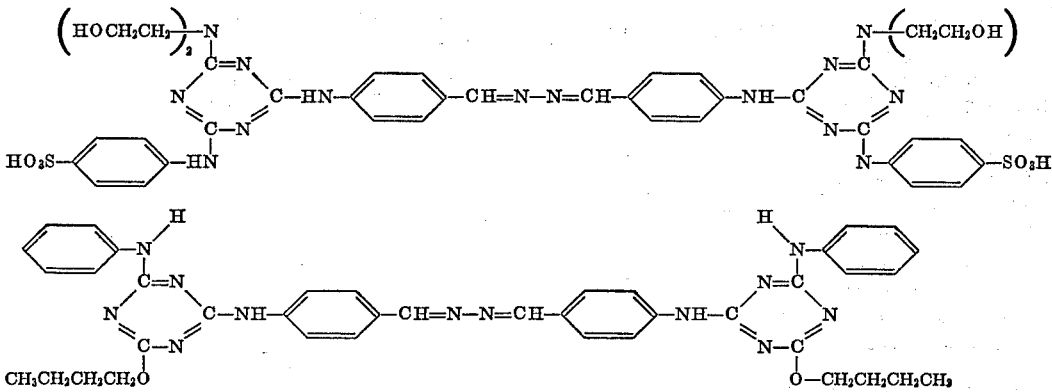

The properties of the above compounds vary depending on the nature of the substituents on the benzaldazine moiety and on the triazinyl ring. Solubility and shade of fluorescence can be adjusted to suit particular applications.

The optical brighteners of this invention may also comprise an admixture of a plurality of the individual brighteners herein described.

The optical brightening agents of this invention may also be obtained by reacting cyanuric chloride with a mixture of a p diamino benzaldazine and a p diamino stilbene. The said mixture of benzaldazine and stilbene may contain from 10% to 90% of the stilbene and from 90% to 10% of the benzaldazine, the percentages being expressed as molar percentages of the total mixture. Preferably the said mixture contains from 40% to 80% of the stilbene and from 60% to 20% of the benzaldazine. The ratio of the number of moles of cyanuric chloride to the combined number of moles of stilbene and benzaldazine in the reaction mixture preferably lies in the range 0.5:1 to 2:1. One embodimet of the said reaction mixture contains the diamino stilbene, the diaminobenzaldazine and cyanuric cholride in the molar ratio 1.70:1.05:4.

The unreacted chlorine atoms of the cyanuric chloride residue, remaining in the product of the reaction between the cyanuric chloride, stilbene and benzaldazine, may be substituted by reaction with compounds containing active hydrogen atoms under basic conditions. Suitable compounds containing active hydrogen atoms are those of the general formula R''H and R'''H where R'' and R''' have the same meaning as before.

The water-soluble optical brightening agents of the present invention are commonly employed in detergent compositions. Such detergent compositions will commonly contain from about 0.01 to 2% preferably 0.1 to 1% by weight of optical brightening agents.

Detergent compositions in which optical brightening agents are employed are most commonly of the heavy duty type. Frequently they contain from about 30 to 60% by weight of a builder salt, normally an alkali metal polyphosphate such as sodium tripolyphosphate, from about 10 to 35% by weight of one or more anionic surface active agents such as sodium alkyl benzene sulphonate, sodium alkene sulphonates or fatty alcohol sulphates. The remainder of the composition will normally be made up of sodium sulphate and various additives present in small proportions to produce specific effects. Optical brightening agents according to the present invention may, however, also be employed in other types of detergent compositions, for example those containing non-ionic surface active agents such as ethoxylated fatty alcohols or phenols. For such compositions compounds containing water solubilising groups as $SO_3Na$ groups are particularly suitable for use as the brightening agents.

The optical brightening agents of the present invention are also of use in the treatment of textile materials both of the natural and synthetic type. The degree to which a particular optical brightening agent is suitable for use with a particular textile material is to some extent dependent upon the nature of the substituents in the compounds. It should be remembered, however, that the nature of the substituent not only affects the suitability of the compound for treating a particular type of fibre but may also affect its light absorption and emission properties and so may result in a colouration of the product.

Optical brightening agents according to the present invention may be applied to textile materials at any stage in their processing. For example they may be added to cellulosic pulps or incorporated into synthetic materials such as polyesters before such materials are spun. Alternatively they may be applied to fabrics after the weaving of fibres, or, in the case of non-woven textiles, the formation of a web.

Normally the optial brightening agents will be applied to finished textiles in the form of a solution or dispersion in suitable liquid medium. For application to textile materials before spinning they may also be employed in such form or in the case of synthetic materials which are spun from a melt or wet spun from a solution may be added directly to the melt or solution as solds.

Optical brightening agents may also be employed for brightening paper. For example, they may be incorporated into the pulp at the wet end of the paper making machine (i.e. in the beaters) in a size base or may be applied to the surface of paper in a coating composition, normally comprising pigments such as clay, binders such as starch or synthetic latex and lubricants such as metallic stearates.

The compounds particularly suitable for optical brightening agents for paper are generally the same as those suitable for cellulosic textiles.

A further use of the optical brightening agents of the invention is in the brightening of plastic materials such as polyvinyl chloride. In such cases the optical brightening agent is normally added to the polymer during the formation of sheets of the material.

EXAMPLE 1

Monomeric 4 - amino-benzaldehyde (24.2 g., M.W. 121.13) is dissolved in 200 ml. water-free benzene and hydrazine hydrate (5.0 g., M.W. 50.06) is added to it. The mixture is refluxed for 5 hours and towards the end of the reaction, water is removed by azeotropic distillation. After recovery of the benzene, diamino benzaldazine is re-crystallised from the minimum quantity of methylated spirits. The product, diamino benzaldazine, is an excellent optical brightener.

EXAMPLE 2

Re-crystallised diamino benzaldazines (0.96 g., M.W. 238) ex. Example 1 is suspended in a solution of sodium bicarbonate (1.32 g.) in 400 ml. of water. The solution shows a weak purple luminescence. Cyanuric chloride (1.48 g., M.W. 184.43) in acetone (20 ml.) is added to the mixture and stirred at 20° C. for 2 hours.

Diethanolamine (0.84 g., M.W. 105.0) is then added and pH adjusted to 9, for which 18 ml. of 1 N NaOH are used. The mixture is heated at 50° C. and stirred for one hour.

p-Sulphanilic acid (1.52 g., M.W. 173.2) is added, pH adjusted continuously. The mixture is heated at 90° C. and stirred for 90 minutes. Another 19 ml. 1 N NaOH are required in this step.

The mixture is coled and salted out with commercial sodium chloride (200 g.). Yield 70% of pure (salt-free) optical brightener.

EXAMPLE 3

Purified or freshly prepared diaminobenzaldazine (1.00 gm.) is suspended in 400 ml. of an aqueous solution of sodium bicarbonate (1.32 gm.) at 20° C. Cyanuric chloride (1.48 gm.) in acetone (10 ml.) is added to the above suspension and the mixture is stirred for three hours at 20° C., after which, morpholine (0.70 gm.) is added, the temperature is raised to 50° C. and the pH is adjusted to 9 by the addition of 1 N NaOH. The reaction mixture is stirred for one hour at this temperature, while the pH is kept at 9 by further additions of 1 N sodium hydroxide solution.

p-Chloroaniline (1.12 gm.) is then added, temperature increased to 90° C. and the mixture is stirred for a further hour, during which the pH is maintained at 9 by further additions of sodium hydroxide solution.

At the end of the reaction time, the mixture is cooled, filtered and the filtrate is salted out with commercial sodium chloride (200 gm.). The yield of OBA, which is a slightly yellowish powder, is 68–74%.

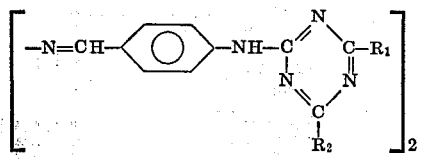

$R_1$=morpholino
$R_2$=chloroanilino.

EXAMPLE 4

Diaminobenzaldazine (1.0 gm.) is suspended in 400 ml. of an aqueous solution of sodium bicarbonate (1.32 gm.) at 20° C. As in Example 1, cyanuric chloride (1.48 gm.) in acetone (10 ml.) is added to the above suspension and the mixture is stirred for three hours at 20° C., after which monethanolamine (MEA) is added, while the temperature is increased to 50° C. and the pH to 9 by the addition of 1 N sodium hydroxide. The reaction mixture is maintained for 1 hour at this temperature, while the pH is adjusted to 9 by further small additions of 1 N sodium hydroxide.

Phenol (0.83 gm.) is then added, temperature increased to 90° C. and the mixture is stirred for a further hour, during which the pH is again adjusted to 9 by further additions of sodium hydroxide solution.

The product is recovered as described in Example 1.

Yields are in the range 68–75%.

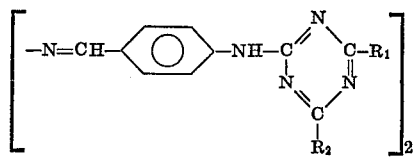

$R_1$=monoethanolamine (MEA)
$R_2$=phenoxy.

EXAMPLE 5

Purified diaminobenzaldazine (1.0 gm.) is suspended in 400 ml. of an aqueous solution of sodium bicarbonate (1.32 gm.) at 20° C. As described above, cyanuric chloride (1.48 gm.) in acetone (10 ml.) is added to the above suspension and the mixture is stirred for three hours at 20° C. Morpholine (0.70 gm.) is then added, temperature increased to 50° C., pH is increased as in Example 1 and the mixture is stirred again for a further hour.

Aniline (0.82 gm.) is then introduced to the reaction mixture, and again the temperature, pH and the reaction time are kept as described in Example 1.

At the end of the reaction, the product is recovered exactly as described in the previous examples.

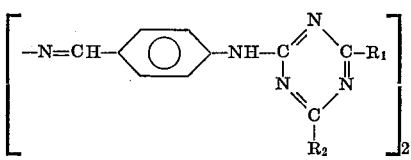

$R_1$=morpholino
$R_2$=aniline.

EXAMPLE 6

Diaminobenzaldazine (1.00 gm.) is suspended in 400 ml. of an aqueous solution of sodium bicarbonate (1.32 gm.) at 20° C. Cyanuric chloride is added exactly as in the previous examples, after which morpholine (0.70 gm.) is added, temperature, pH are adjusted as previously described, after which sulphanilic acid (1.52 gm.) is added and again pH, temperature and reaction time are kept as described in previous examples. The recovery of the finished product proceeds exactly on the same lines as has been carried out in Examples 1–3.

Yield 68–75%.

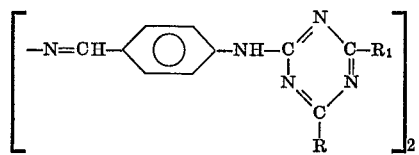

$R_1$=morpholine
$R_2$=p-sulphanilino.

EXAMPLE 7

4,4'-diaminostilbene-2,2'-disulphonic acid (0.8 gm.) and diaminobenzaldazine (0.5 gm.) are suspended in 700 ml. of an aqueous solution of sodium bicarbonate (1.32 gm.) at 0° C. Cyanuric chloride (1.48 gm.) in acetone (10 ml.) is slowly added and the mixture stirred for one hour at 0° C. Temperature is then increased to 20° C. and the stirring is continued at this temperature.

Morpholine (0.7 gm.) is added, the temperature is increased to 50° C. and pH adjusted to 9 by addition of sodium hydroxide solution. At these conditions, the reaction mixture is stirred for one hour, after which p-chloroaniline (1.12 gm.) is added, the temperature is increased this time to 90° C., pH is maintained at 9 by further adjustments with sodium hydroxide solution and the reaction mixture is stirred for another hour.

Sodium chloride (200 gm.) is added to the hot solution which is then allowed to cool. The product is separated in 78–85% yield.

EXAMPLE 8

4,4′-diaminostilbene-2,2′-disulphonic acid (0.8 gm.) diaminobenzaldazine (0.5 gm.) are suspended in 700 ml. of an aqueous solution of sodium bicarbonate (1.32 gm.) at 0° C. Cyanuric chloride (1.48 gm.) in acetone (10 ml.) is added and the stirring is carried out as described in the previous example.

Monoethanolamine (MEA) (0.49 gm.) is then added, temperature increased to 50° C., pH adjusted to 9 with sodium hydroxide solution and the reaction mixture is stirred again for one hour.

Phenol (0.83 gm.) is then added, pH adjusted to 9, temperature increased to 90° C. and the reaction conditions are kept the same for a further one hour, while the mixture is being stirred.

The recovery of the product is achieved by salting out, as has been described in Example 5.

Yield 80–82%.

EXAMPLE 9

4,4-diaminostilbene-2,2′-disulphonic acid (0.8 gm.) and diaminobenzaldazine (0.5 gm.) are suspended in 700 ml. of an aqueous solution of sodium bicarbonate (1.32 gm.) at 0° C. Cyanuric chloride (1.48 gm.) and later morpholine (0.7 gm.) are added under exactly the same conditions as described in Example 5. The aniline (0.8 gm.) is added, the temperature is increased again to 90° C., while pH is adjusted to 9 with dilute sodium hydroxide. After stirring for one hour, the product is salted out, as has been described in previous examples.

Yield 80–89%.

EXAMPLE 10

4,4′-diaminostilbene-2,2′-disulphonic acid (0.8 gm.) and diaminobenzaldazine (0.5 gm.) are condensed with cyanuric chloride as described in the above example, then morpholine (0.7 gm.) is added, the temperature increased to 50° C., pH adjusted to 9 by addition of sodium hydroxide solution, and the reaction mixture is stirred for one hour.

Sulphanilic acid (1.52 gm.) is added, temperature and pH adjusted as in Example 5. After stirring for one hour, the product is obtained by salting out in the usual way.

Yield 80–85%.

EXAMPLE 11

The prime factor involved in the evaluation of optical brightening agents is whether or not the produce fluoresces when irradiated by ultra-violet light. With regard to the application of optical brightening agents to textile materials, substantivity to the materials, together with improvement i nthe visual brightness (apparent whiteness) of the fabric, is also of importance.

In application trials, the optical brightening agents of Examples 3 to 10 are applied to fabrics comprising the following textile materials:

Wool
Cotton
Nylon
"Crimplene" polyester fibre
"Acrilan" polyacrylonitrile fibre
Secondary acetate fibre.

These fabrics are treated with the optical brightening agents of Examples 3 to 10 under a number of different application conditions followed by washing-off using copious quantities of cold water.

By this means the material upon which each of the experimental products is more substantive and fluorescent can be determined.

In each case a liquor to goods ratio of 40:1 was used, application being made at the boil for 10 minutes followed by a thorough rinsing. The application methods used were as follows:

(a) 3.0% (O.W.F.) acetic acid, 60%, pH 5.0
(b) 5.0% (O.W.F.) formic acid, 85%, pH 2.5
(c) 5.0 g./l. Glaubers salt, pH 6.5
(d) 1.0 cc./litre ammonia (S.G. 0.880), pH 9.5
(e) 3.0 g./l. Hydros 1 (trademark for Albright & Wilson Limited's brand of sodium hydrosulphite), pH 5.0 (at boil)
(f) 3.0% (O.W.F.) monoammonium phosphate, pH 6.0
(g) 2.0% (O.W.F.) sodium hydroxide, pH 11.5
(h) 3.0% (O.W.F.) sodium dihydrogen phosphate, pH 5.0
(i) 3.0% (O.W.F.) disodium hydrogen phosphate, pH 7.5
(j) 20 g./l. sodium hypochlorite (12.5% $Cl_2$), ca. pH 11.5
(k) 5.0 g./l. sodium sulphite, pH 10.2
(l) 5.0 g./l. sodium bisulphite, pH 5.5
(m) 2.0 g./l. sodium chlorite, 1.0 g./l. formic acid, 85%, ca. pH 4.5
(n) 2.5 vol. hydrogen peroxide, to pH 8.5 with tetrasodium pyrophosphate, pH 8.5
(o) 3.0% (O.W.F.) aluminum sulphate, 1.0% (O.W.F.) formic acid, 85%, pH 3.0
(p) 3.0% (O.W.F.) aluminum sulphate, 3.0% (O.W.F.) ammonia (S.G.O. 880), pH 8.5

Note.—The term "O.W.F." stands for "on weight of fabric."

Results.—After the simultaneous application of each optical brightening agent to equivalent weights of the six aforementioned textile materials, the optically-brightened samples are examined visually under ultraviolet light and the fluorescence and tone of fluorescence are noted. The optically-brightened samples are also examined to determine whether the substrate has been stained by the optical brightening agent.

By taking those methods and substrates that give good fluorescence and absence of staining of the substrate, and then eliminating those results that do not show any visual brightness benefits, we should arrive at the optimum application method or methods, for each optical brightening agent applied to each fibre.

The following table illustrates the fabrics to which each product is substantive and the best methods of application:

| Substrate | Methods of application which provide best substantivity and fluorescence |
|---|---|
| Product of example: | |
| 3 — Cotton | h |
|      Polyester | o |
| 4 — Nylon | o |
| 5 — Cotton | b, h, j |
|      Polyester | e |
| 6 — Cotton | h |
|      Nylon | l, n |
|      Polyester | b, c, h, i, j, k, l |
| 7 — Wool | e, f, h, k, l, n |
|      Cotton | d, e, g, h, i, j, k, l |
|      Nylon | a, e, h, l |
|      Polyacrylonitrile | h, m |
|      Acetate | e, g, l |
| 8 — Wool | e |
|      Cotton | e, f |
|      Nylon | e |
|      Polyacrylonitrile | e |
|      Acetate | e |
| 9 — Wool | e, l, p |
|      Cotton | e, g, l, k, n |
|      Nylon | e |
|      Acetate | g |
| 10 — Wool | h, j, l |
|      Cotton | g, h, i, k, l |
|      Nylon | a, l, o |
|      Acetate | g |

By the same method of analysis and comparison, three commercially-sold optical brightening agents, viz.

(1) 4,4'-bis[4"-p-chlor-aniline-6" morphilino-triazinyl amino]stilbene 2,2' disulphonic acid,
(2) 4-methyl-7-diethyl-amino-coumarin,
(3) 4,4' bis [4"-morpholino-6"-p sulpho-anilino-triazinyl amino] stilbene 2,2' disulphonic acid, exhibited good substantivity and fluorescence when applied by the following methods.

| Product: | Substrate | Method |
|---|---|---|
| 1 | Wool | a, b, c, e, f, h, i, l, p |
| | Cotton | a, b, c, d, e, f, h, i, l, p |
| | Nylon | a, b, c, d, e, f, h, i, k, l, m, n, p |
| | Polyester | f |
| | Acetate | c, e, g, h, i, k, l, n, p |
| 2 | Wool | b, c, e, f, h, l, p |
| | Cotton | c, e, i, k, l, n |
| | Nylon | a, b, c, e, f, h, k, l, o, p |
| 3 | Wool | i, k |
| | Cotton | a, c, n |
| | Nylon | b, c, d, e, f, g, h, i, k, l, n |
| | Polyacrylonitrile | a, b, d, e, f, g, h, i, k, l, m, o, p |
| | Acetate | a, b, c, d, e, f, g, h, i, j, k, l, m, n, o, p |

EXAMPLE 12

The optical brightening agents of Examples 3 to 10 may also be examined for their optical brightening of paper pulp. The raw stock used is semi-bleached kraft stock that does not contain any optical brightening agent. The stock is pulped at 10.0% pulp in a Kenwood mixer with the liquidizer attachment set at speed 2 for 5 minutes. Optical brightening agent (0.01% solution) is added to the pulp and stirring is continued for 10 minutes. This treatment is followed by vacuum filtration.

The fluorescent properties of the pulp with the optical brightening agents of Examples 3 to 10 added, are compared with the fluorescent properties of the pulp with a commercially known optical brightening agent added. The results are as follows:

| Product of example | Tone of fluorescence | Fluorescence property | Comparison with 4-methyl-7-diethyl amino coumarin |
|---|---|---|---|
| 3 | Blue | Very little of this product is retained by the pulp | Weak. |
| 4 | do | The O.B.A. is retained by the pulp. No improvement in the whiteness of the pulp. | Not as strong as control. |
| 5 | Blue-violet | Only slightly retained by the pulp. No improvement in the whiteness of the pulp. | Similar to product of Example 4. |
| 6 | Blue | As for product of Example 3 | As for product of Example 3. |
| 7 | do | Strongly fluoresces. A marked improvement of the whiteness of the pulp is observed. | About 75% as strong. |
| 8 | do | Strongly fluoresces. A marked improvement of the whiteness of the pulp. | About 50% as strong. |
| 9 | do | Strongly fluoresces. An improved whiteness of the pulp is noticed more than product of Example 7. | Similar to control. |
| 10 | do | Strongly fluoresces but stains the pulp yellow, even in low concentrations. | Weak. |

Hence, it can be seen from the above that the optical brightening agents derived solely from the benzaldazine compound are not satisfactory for application to paper pulp from an aqueous bath alone; whereas those optical brightening agents derived by the method of Examples 7, 8 and 9, show vastly improved optical brightening properties on paper pulp, the visual whiteness of the resultant paper being considerably increased.

What I claim is:
1. A compound of the formula:

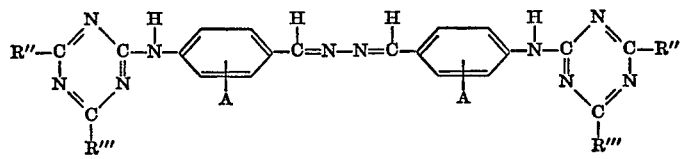

wherein A and A' may be the same or different and are selected from the group consisting of hydrogen and $SO_3M$, wherein M is selected from the group consisting of hydrogen, alkali metal, and alkaline earth metal cations and R" and R'" are the same or different and are selected from the group consisting of halogen, hydroxyl

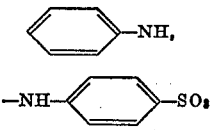

as its alkali metal salt,

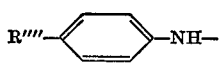

wherein R"" is an alkyl group,
halogen substituted phenylamino,
morpholino,

—$NA_1A_2$ wherein $A_1$ and $A_2$ are each selected from the group consisting of hydrogen, —$C_2H_4OH$, Cl and short chain alkyl groups,
$CH_3CH(OH)CH_2$—O—,
short chain alkoxy radicals,
phenoxy and alkyl substituted phenoxy groups,

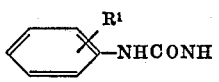

wherein $R_1$ is hydrogen or an alkyl group,

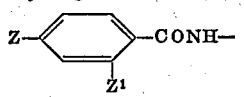

wherein Z is a methyl or methoxyl group, and Z' is a methyl group or hydrogen, and phenyl.
wherein R'' is morpholino and R''' is p-chloroanilino.

2. Compounds according to claim 1, wherein R'' is the morpholino group and R''' is the p-chloroanilino group.

3. Compounds according to claim 1 wherein R'' is the morpholino group and R''' is the anilino group.

4. Compounds according to claim 1, wherein R'' is the morpholino group and R''' is the sulphanilic acid group.

5. Compounds according to claim 1, wherein R'' is the monoethanolamine group and R''' is the phenoxy group.

6. The compound of claim 1 having the formula

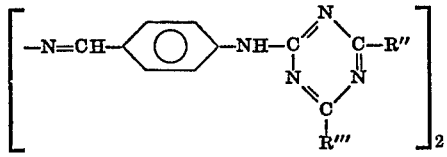

wherein R'' is morpholino and R''' is p-chloroanilino.

7. The compound of claim 1 having the formula

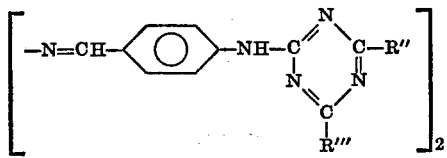

wherein R'' is monoethanolamino, and R''' is phenoxy.

8. The compound of claim 1 having the formula

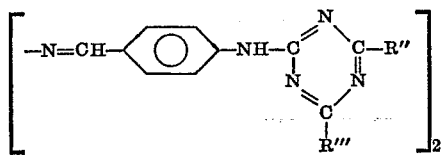

wherein R'' is morpholino and R''' is anilino.

9. The compound of claim 1 having the formula

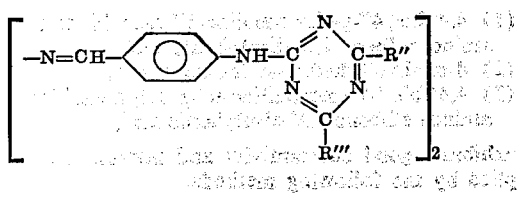

wherein R'' is morpholino and R''' is a sulphanilic acid group.

10. The compound of claim 1 having the formula

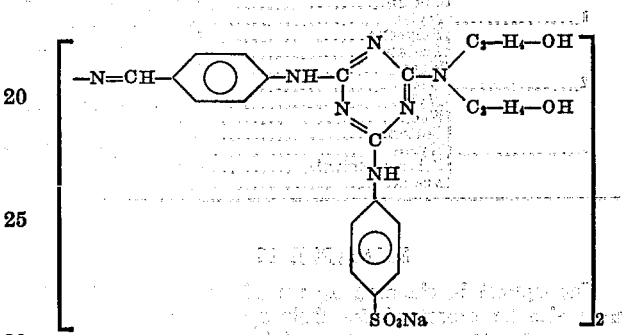

References Cited

UNITED STATES PATENTS 2,440,070   4/1948   Blout et al. _____ 260—566 B

OTHER REFERENCES

Chemical Abstracts, vol. 47, cols. 2732–2733 (abst. of Miyatake), 1953.

JOHN D. RANDOLPH, Primary Examiner

U.S. Cl. X.R.

106—176; 117—33.5 T; 252—152, 301.2 W, 543; 260—92.3, 558 P, 559 R, 562 P

UNITED STATES PATENT OFFICE
CERTIFICATE OF CORRECTION

Patent No. 3,780,029          Dated December 18, 1973

Inventor(s)   TARAS JASKEWYCZ

It is certified that error appears in the above-identified patent and that said Letters Patent are hereby corrected as shown below:

Column 1, line 3, replace "Fach" with --Foch--.

Column 1, following line 5, insert:

--Claims priority Australia Application No. 62934/69 filed October 28, 1969.--

Column 2, lines 34 and 35, delete "phenyl-amine" which bridges these lines.

Column 2, line 42, replace "$-C_3H_4OH$" with -- $-C_2H_4OH$ --.

Column 3, line 15, replace "NH'" with --NN'--.

Column 4, in the middle formula, the p-amino sulphonic acid group should have a hydrogen atom attached to the nitrogen atom as in the inked addition to a copy of the page of the patent containing Columns 3 and 4 which is enclosed herewith.

Column 8, line 70, after "Cotton" replace "e,g,i,k,n" with --e,g,j,k,n--.

Column 8, line 73, after "Cotton" replace "g,h,i,k,l" with --g,h,j,k,l --.

Column 11, line 9, delete all of the subject matter on this line.

Column 11, line 15, replace "sulphanilic acid" with --p-sulphoanilino--.

(cont. on page two)

UNITED STATES PATENT OFFICE
CERTIFICATE OF CORRECTION

Patent No. 3,780,029      Dated December 18, 1973

Inventor(s) TARAS JASKEWYCZ

It is certified that error appears in the above-identified patent and that said Letters Patent are hereby corrected as shown below:

(page two)

Column 11, line 18, replace "monoethanolamine" with --monoethanolamino--.

Column 12, lines 13 and 14, replace "a sulphanilic acid group" with --p-sulphoanilino--.

Signed and sealed this 20th day of August 1974.

(SEAL)
Attest:

McCOY M. GIBSON, JR.
Attesting Officer

C. MARSHALL DANN
Commissioner of Patents